No. 859,066.

PATENTED JULY 2, 1907.

J. HUMMEL.
FRICTION DRIVING GEAR.
APPLICATION FILED MAY 31, 1906.

2 SHEETS—SHEET 2.

Witnesses

Inventor
Josef Hummel,
by H. B. Willson & Co.
Attorneys

UNITED STATES PATENT OFFICE.

JOSEF HUMMEL, OF PARIS, FRANCE.

FRICTION DRIVING-GEAR.

No. 859,066.         Specification of Letters Patent.         Patented July 2, 1907.

Application filed May 31, 1906. Serial No. 319,612.

*To all whom it may concern:*

Be it known that I, JOSEF HUMMEL, a subject of the King of Austria, residing at Paris, France, have invented certain new and useful Improvements in Friction Driving-Gears; and I do declare the following to be a full, clear, and exact description of the invention, such as will enable others skilled in the art to which it appertains to make and use the same.

My invention relates to improvements in friction driving gears for use on machines for mixing or beating eggs, cream, light pastes and the like and on other machinery.

The object of the invention is to provide a simple, durable and effective frictional gearing of this character by means of which the speed of the driven shaft, and hence the beater or agitator which it carries, may be varied as desired while the machine is in motion.

With the above and other objects in view, the invention consists of certain novel features of construction, combination and arrangement of parts hereinafter described and claimed.

Figure 1:
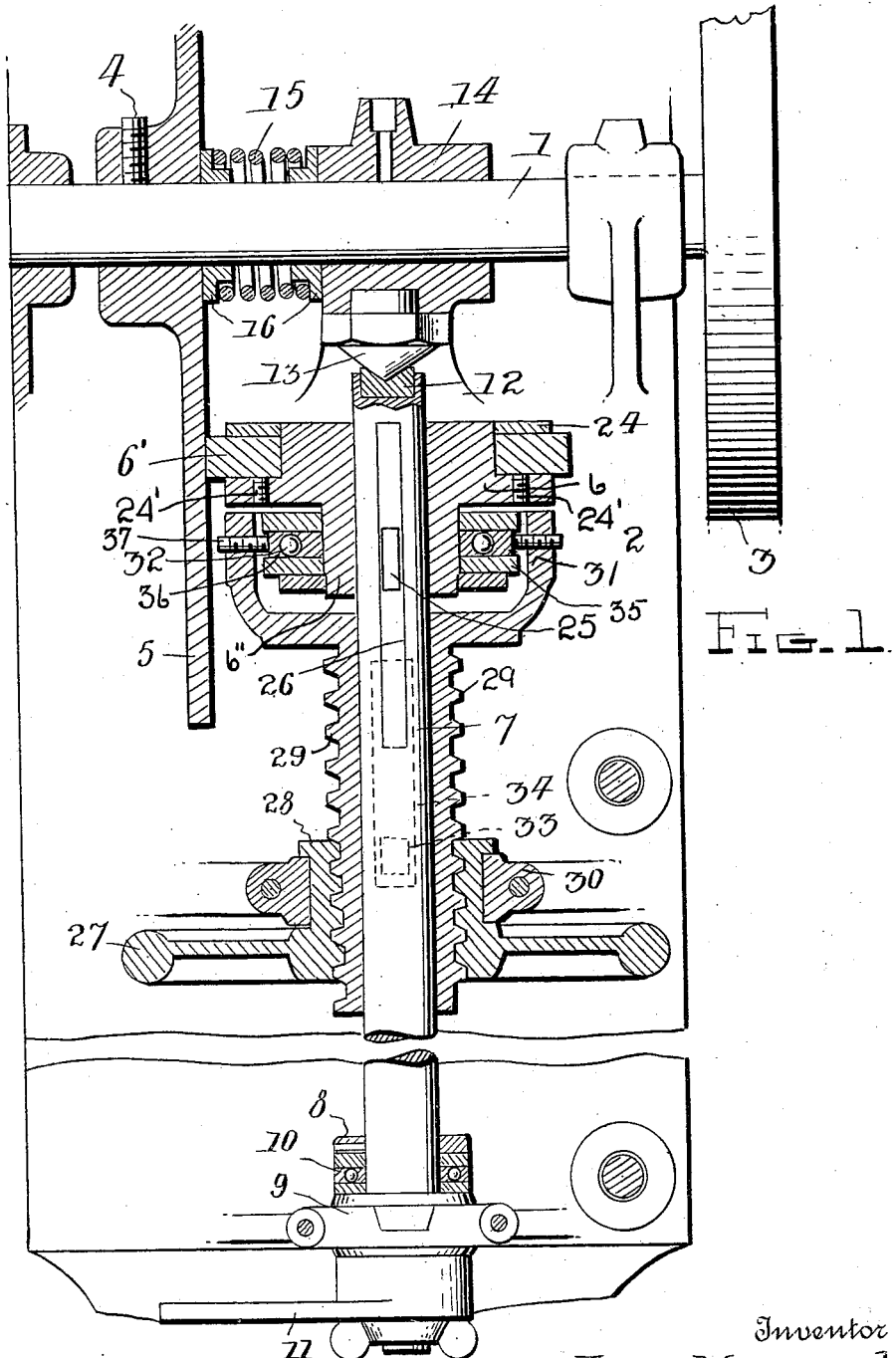
Figure 2:
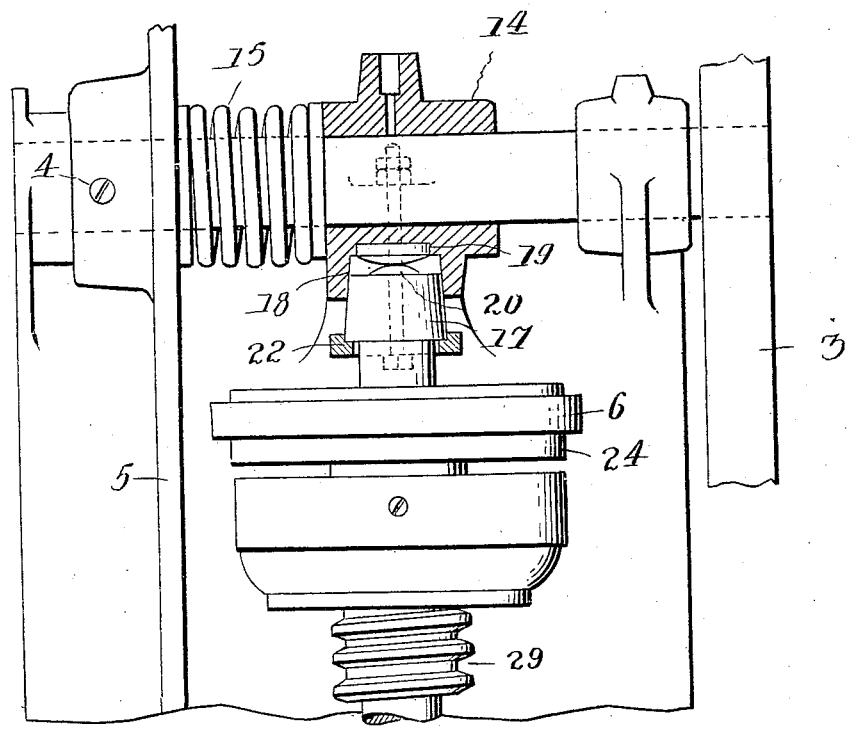
Figure 3:
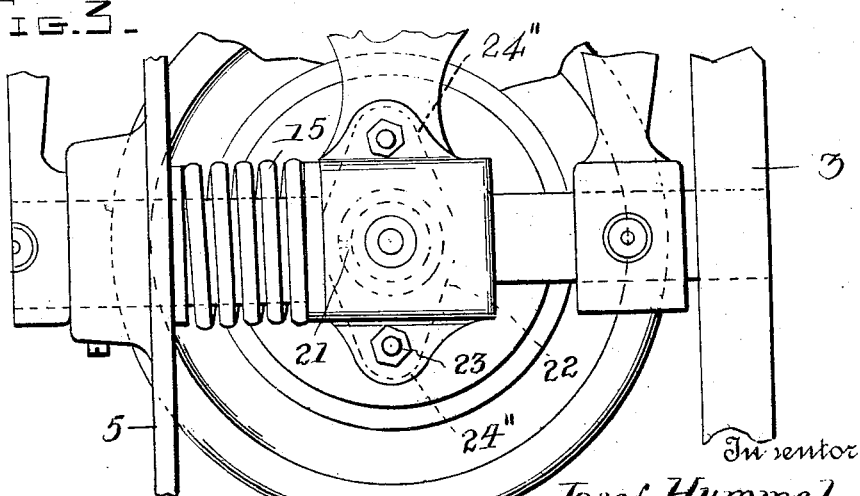

In the accompanying drawings:—Figure 1 is a vertical sectional view through my improved variable speed friction gearing; Fig. 2 is a side elevation, with parts in section, of a slightly modified form of the same, and Fig. 3 is a top plan view of the parts shown in Fig. 2.

Referring to the drawings by numeral, 1 denotes the main drive shaft mounted in suitable bearings upon a frame or support 2 and having upon one of its ends a band-wheel or similar driving element 3. Fixed upon said shaft, by a screw or other fastening means 4, is a large friction driving wheel or disk 5, which is adapted to impart its motion to a small driven friction wheel or roller 6 mounted upon a driven shaft 7 disposed at right angles to the shaft 1. The shaft 7 is preferably disposed vertically and has secured upon it, adjacent to its lower end, a collar 8, between which and a stationary bearing 9 upon the support 2, is provided an annular row of bearing balls or anti-friction devices 10. Said lower end of the shaft has mounted upon it a crank 11, or any other suitable device for operating the beater or agitator of a machine for mixing or beating eggs, cream and the like, or for any other purpose. The upper end of the shaft 7 carries a steel seat 12, which receives a steel pivot 13 upon a bearing block 14. The latter is stationary, being supported by a bracket arm from the frame or support 2. The shaft 1 is adapted to have a slight longitudinal sliding movement in its bearings and in the bearing-block 14, and surrounding it between two collars 16, is a coil-spring 15, which serves to force the driving disk 5 away from the driven friction wheel or roller 6. Any suitable means (not shown) may be provided for moving the shaft 1 and the driving disk 5 longitudinally against the tension of the spring 16, so as to cause the latter to frictionally engage the periphery of the driven wheel 6.

Instead of employing the parts 12, 13, shown in Fig. 1, I may substitute therefor a split, tapered or frusto-conical shaped ring or band 17 adapted to enter a socket 18 formed in the bearing-block 14 and having in its bottom a steel bearing plate 19. The latter is engaged by a similar pivot 20 provided on the upper end of the shaft 7 and surrounded by the bearing sleeve or band 17, which latter is split longitudinally or vertically, as shown at 21 in Fig. 3. This bearing sleeve or band 17 is supported upon an apertured plate 22, through which the shaft 7 extends, and it is adjustable by means of bolts 23 toward and from the projecting lugs 24″ upon the opposite sides of the bearing block 14, as clearly shown in Fig. 3. By tightening the nuts of the bolts 23, the supporting plate 22 will be elevated to force the split band or sleeve 17 into the socket 18 of the bearing block, and thus compensate for the wear of said parts. The driven friction wheel or roller 6 has a friction surface or periphery 6′ clamped upon it by means of a removable plate 24, secured by screws as 24′ and it is slidably mounted upon the upper portion of the shaft 7, so that it may be moved toward and from the center of the driving disk 5 for the purpose of varying its speed. The said driven wheel 6 is permitted to slide upon the shaft 7, but is caused to rotate therewith by a transverse pin or key 25 which it carries and which projects through and slides in a longitudinal slot 26 formed in said shaft 7. The driven wheel 6 is adjusted upon the shaft 7 by turning a hand-wheel 27, which has its hub internally screw-threaded to provide a nut 28, which receives the square, external screw-threads 29 upon a tubular screw or shaft which surrounds and slides upon the shaft 7. The hub or nut 28 is swiveled or mounted to rotate in a stationary bearing 30 provided upon the support 2, and at the upper end of the hollow screw is a cup 31, which has a ball-bearing connection 32 with the hub 6″ of the driven wheel or roller 6. This ball bearing comprises a casing 35, the ring 36 of which is fixed by screws 37 to the cup 31 at the top of the screw 29 and the remainder of the casing is fixed to the boss or hub of the roller 6. It will be seen that by rotating the hand-wheel 27, the screw 29 will be raised and lowered and will carry the driven wheel 6 with it, a guide piece 33 engaged with a straight guide groove 34 being provided for the purpose of guiding said parts.

From the foregoing description taken in connection with the accompanying drawings, the construction, operation and advantages of the invention will be readily understood without requiring a more extended explanation.

Various changes in the form, proportion and the minor details of construction may be resorted to without departing from the principle or sacrificing any of the advantages of the invention, as defined by the appended claims.

Having thus described my invention, what I claim as new and desire to secure by Letters-Patent is:—

1. The combination of a driving shaft having a friction disk fixed thereon, a driven shaft mounted to rotate at right angles to said driving shaft, a friction roller slidably connected with said driven shaft in position to engage said friction disk, said roller having an extended hub, a hollow screw slidable on said driven shaft and having at its upper end a cup-shaped member and a ball bearing connection between said cup-shaped member and the hub of said roller and means for raising and lowering said screw.

2. The combination of a driving shaft having a friction disk fixed thereon, a driven shaft mounted to rotate at right angles to said driving shaft, a friction roller slidably connected with said driven shaft in position to engage said friction disk, said roller having an extended hub, a hollow screw slidable on said driven shaft and having at its upper end a cup-shaped member, a casing mounted on said hub and having balls arranged therein and an annular member fixed to said cup-shaped member and adapted to close said casing and contact with said balls.

In testimony whereof I have hereunto set my hand in presence of two subscribing witnesses.

JOSEF HUMMEL.

Witnesses:
HANSON C. COXE,
ANTOINE AUGIER.